US010382632B2

(12) United States Patent
Yamashita

(10) Patent No.: US 10,382,632 B2
(45) Date of Patent: Aug. 13, 2019

(54) IMAGE PROCESSING UNIT, INFORMATION PROCESSING SYSTEM, PROGRAM, AND INFORMATION PROCESSING METHOD

(71) Applicant: Akihiro Yamashita, Kanagawa (JP)

(72) Inventor: Akihiro Yamashita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 692 days.

(21) Appl. No.: 14/876,975

(22) Filed: Oct. 7, 2015

(65) Prior Publication Data
US 2016/0105568 A1 Apr. 14, 2016

(30) Foreign Application Priority Data

Oct. 14, 2014 (JP) .................................. 2014-210158

(51) Int. Cl.
*G06F 3/12* (2006.01)
*H04N 1/00* (2006.01)
*H04N 1/44* (2006.01)

(52) U.S. Cl.
CPC ....... *H04N 1/00204* (2013.01); *G06F 3/1222* (2013.01); *G06F 3/1238* (2013.01); *G06F 3/1273* (2013.01); *G06F 3/1286* (2013.01); *H04N 1/00* (2013.01); *H04N 1/4413* (2013.01); *H04N 1/4426* (2013.01); *H04N 2201/0094* (2013.01)

(58) Field of Classification Search
None
See application file for complete search history.

(56) References Cited

U.S. PATENT DOCUMENTS

| 8,542,385 | B2 | 9/2013 | Akutsu | |
|---|---|---|---|---|
| 2008/0082430 | A1* | 4/2008 | Kamata | G06Q 30/04 705/30 |
| 2008/0232840 | A1* | 9/2008 | Ebihara | G03G 15/553 399/79 |

(Continued)

FOREIGN PATENT DOCUMENTS

| JP | 2008-021233 | 1/2008 |
|---|---|---|
| JP | 2008-134443 | 6/2008 |

(Continued)

OTHER PUBLICATIONS

Extended European Search Report dated May 18, 2016.
Office Action dated Jun. 19, 2018 issued with respect to the basic Japanese Patent Application No. 2014-210158.

*Primary Examiner* — Huo Long Chen
(74) *Attorney, Agent, or Firm* — IPUSA, PLLC

(57) ABSTRACT

An image processing unit includes a first memory unit configured to store a first setup value which is set for each of groups including a user and indicates an upper limit of a usage amount, within which the user included in each group can use a function; a second memory unit configured to store a second setup value which is set for each user and indicates the usage amount enabling each user to use the function in addition to the first setup value; a third memory unit configured to store a current value which indicates the usage amount of the function used by each user; and a determination unit configured to determine whether the current value exceeds a predetermined first threshold determined using the first setup value set for the group and the second setup value set for each user.

19 Claims, 17 Drawing Sheets

(56) References Cited

U.S. PATENT DOCUMENTS

| | | | |
|---|---|---|---|
| 2009/0268225 A1* | 10/2009 | Sugiyama | G06F 3/1203 358/1.14 |
| 2011/0188073 A1* | 8/2011 | Akutsu | G06F 15/00 358/1.15 |
| 2012/0002230 A1 | 1/2012 | Yamazaki | |
| 2013/0057900 A1 | 3/2013 | Ohta | |

FOREIGN PATENT DOCUMENTS

| JP | 2011-159193 | 8/2011 |
|---|---|---|
| JP | 2013-247425 | 12/2013 |
| JP | 2015-032849 | 2/2015 |

* cited by examiner

| USER NAME | PASSWORD | GROUP NAME |
|---|---|---|
| tanaka | ******** | DESIGN 1G |
| yamashita | ******** | DESIGN 1G |
| yamada | ******** | DESIGN 1G |
| saitoh | ******** | SALES 1G |
| ... | ... | ... |

| CARD ID | USER NAME |
|---|---|
| C00001 | tanaka |
| C00002 | yamashita |
| C00003 | yamada |
| C00004 | saitoh |
| ... | ... |

FIG.7

| LOG ID | OPERATION DATE AND HOUR | LOG KIND | USER NAME | CARD ID | COLOR /MONOCHROME | PAGE NUMBER |
|---|---|---|---|---|---|---|
| 1 | 1/30 5:00:00pm | COPY | tanaka | C00001 | MONOCHROME | 10 |
| 2 | 1/30 6:00:00pm | PRINT | tanaka | C00001 | COLOR | 2 |
| 3 | 1/31 7:00:00pm | PRINT | yamada | C00003 | MONOCHROME | 3 |
| 4 | 1/31 7:30:00pm | COPY | yamada | C00003 | MONOCHROME | 5 |
| 5 | 2/1 2:00:00pm | COPY | saitoh | C00004 | COLOR | 2 |
| 6 | 2/1 3:00:00pm | COPY | yamashita | C00002 | MONOCHROME | 20 |
| ... | ... | ... | ... | ... | ... | ... |

| GROUP NAME | UPPER LIMIT POINT VALUE |
|---|---|
| DESIGN 1G | 1000 |
| DESIGN 2G | 1000 |
| SALES 1G | 2000 |
| ... | ... |

| USER NAME | CURRENT POINT VALUE | ADDITIONAL POINT VALUE |
|---|---|---|
| tanaka | 100 | 10 |
| yamashita | 200 | 300 |
| yamada | 500 | 0 |
| saitoh | 1000 | 0 |
| ... | ... | ... |

FIG.10

| GROUP NAME | COLOR PRINT | COLOR COPY | MONOCHROME PRINT | MONOCHROME COPY |
|---|---|---|---|---|
| DESIGN 1G | 5 | 10 | 1 | 1 |
| DESIGN 2G | 5 | 10 | 1 | 1 |
| SALES 1G | 5 | 5 | 1 | 1 |
| ... | ... | ... | ... | ... |

| USER NAME | CORRECTION POINT VALUE |
|---|---|
| tanaka | 0 |
| yamashita | 0 |
| yamada | 50 |
| saitoh | 70 |
| ... | ... |

IMAGE PROCESSING UNIT, INFORMATION PROCESSING SYSTEM, PROGRAM, AND INFORMATION PROCESSING METHOD

BACKGROUND OF THE INVENTION

1. Field of the Invention

The present invention relates to an image processing unit, an information processing system, a program, and an information processing method.

2. Description of the Related Art

An example of a technique enables an upper limit value of an image forming apparatus to be set for each user for the purpose of limiting usage or administering a resource of the image forming apparatus (e.g., Patent Documents 1 and 2). An example of a technique sets an upper limit value for each group to which multiple users belong and enables the upper limit value to be set for each user in response to a priority of a user who belongs to the group (e.g., Patent Document 3).

Patent Document 1: Japanese Laid-Open Patent Publication No. 2013-247425

Patent Document 2: Japanese Laid-Open Patent Publication No. 2008-21233

Patent Document 3: Japanese Laid-Open Patent Publication No. 2011-159193

SUMMARY OF THE INVENTION

However, in the above examples, the administrator of the image forming apparatus needs to set an upper limit value or a priority for each user. This setup of the upper limit value or the priority requires time and effort. In many cases, it is difficult to determine how to set the priority between users at a time of setting the priority for each user.

It is a general object of at least one embodiment of the present invention to provide an image processing unit that substantially obviates one or more problems caused by the limitations and disadvantages of the related art.

One aspect of the embodiments of the present invention may be to provide an image processing unit including a first memory unit configured to store a first setup value which is set for each of groups including at least one user and indicates an upper limit of a usage amount, within which the at least user included in each group can use a function; a second memory unit configured to store a second setup value which is set for each of the at least one user and indicates the usage amount enabling each user of the at least one user to use the function in addition to the first setup value; a third memory unit configured to store a current value which indicates the usage amount of the function used by each user; and a determination unit configured to determine whether the current value exceeds a predetermined first threshold determined using the first setup value set for a group, in which each user is included, among the groups and the second setup value set for each user of the at least one user.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

BRIEF DESCRIPTION OF THE DRAWINGS

FIG. 5 illustrates a structure of exemplary user information.

FIG. 6 illustrates a structure of exemplary card information.

FIG. 7 illustrates a structure of exemplary log information.

FIG. 8 illustrates a structure of exemplary group information.

FIG. 9 illustrates a structure of exemplary point information.

FIG. 10 illustrates a structure of exemplary calculation coefficient information.

FIG. 16 illustrates a structure of exemplary correction point information.

DETAILED DESCRIPTION OF THE PREFERRED EMBODIMENTS

A description is given below, with reference to the FIG. 1 through FIG. 19 of embodiments of the present invention. Where the same reference symbols are attached to the same parts, repeated description of the parts is omitted.

Reference symbols typically designate as follows:
1: information processing system;
10: image forming apparatus;
11: card reader unit;
12: main body control unit;
13: main body function unit;
14: authentication communication unit;
15: log report unit;
20: authentication administration apparatus;
21: authentication unit;
22: user information memory unit;
23: card information memory unit;
30: log administration apparatus;
31: log administration unit;
32: log information memory unit;
40: upper limit administration apparatus;
41: upper limit determination unit;
42: point calculation unit;
43: point information update unit;

44: alert report unit;
45: group information memory unit;
46: point information memory unit;
47: calculation coefficient information memory unit;
50: PC terminal;
51: display unit; and
52: additional point setup unit.
[First Embodiment]
<System Structure>

Figure 1:
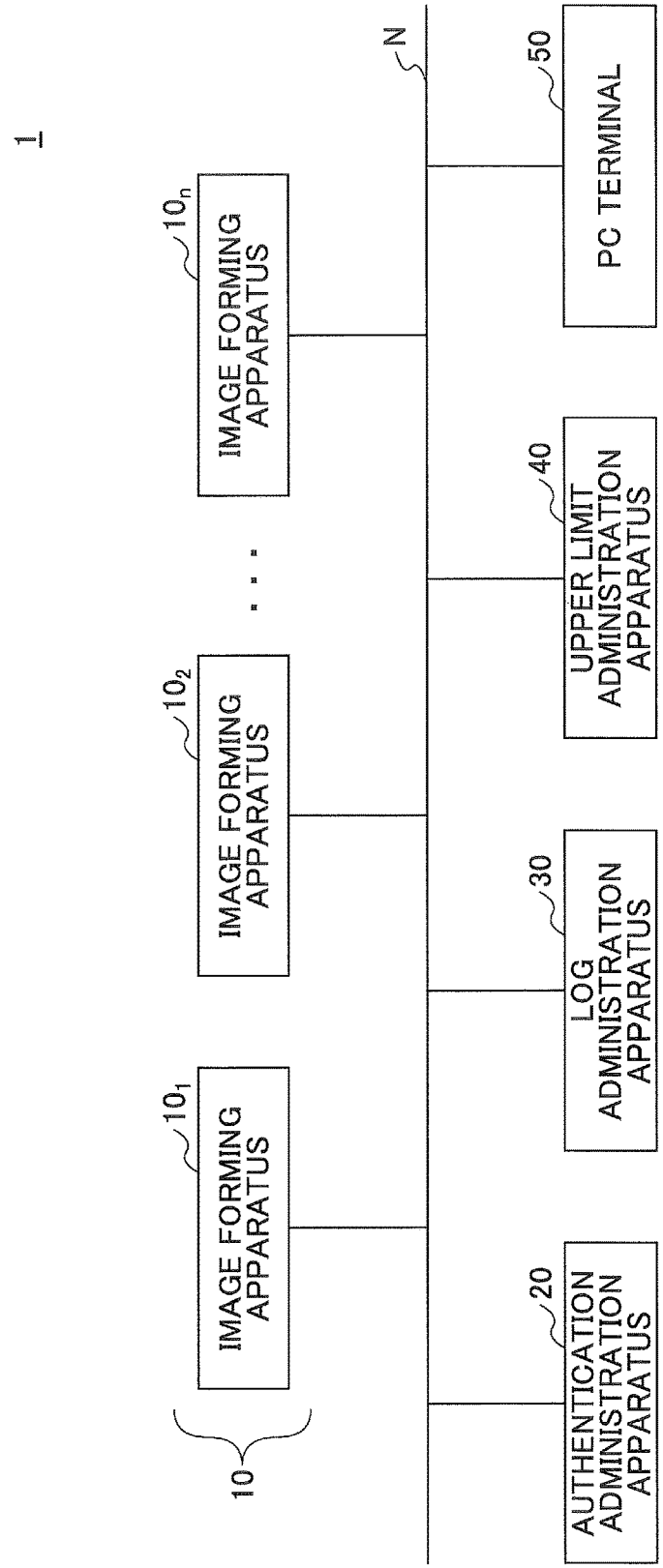
FIG. 1 illustrates a structure of an exemplary information processing system of a first embodiment.

An information processing system 1 of a first embodiment is described. FIG. 1 illustrates a system structure of the information processing system of the first embodiment. The information processing system 1 illustrated in FIG. 1 includes image forming apparatuses $10_1$ to $10_n$, an authentication administration apparatus 20, a log administration apparatus 30, an upper limit administration apparatus 40, and a PC terminal 50, which are mutually connected through a network. The network N is, for example, a local area network (LAN) or the like. Hereinafter, the image forming apparatuses 101 to 10n are collectively represented by an "image forming apparatus 10".

The image forming apparatus 10 is an exemplary image processing unit such as a multifunction peripheral (MFP) which perform a requested job requested by a user (requested image processing). However, the image processing unit is not limited to the image forming apparatus 10 and may be various electronic apparatuses such as a printer, a scanner, a projector, an electronic blackboard, a digital signage, a game machine, and so on. Said differently, the embodiment of the present invention is applicable to an information processing system that includes various electronic apparatuses and performs a requested job requested by a user so as to perform the following processes in collaboration with an authentication administration apparatus 20, a log administration apparatus 30, an upper limit administration apparatus 40, and so on.

The authentication administration apparatus 20 is an exemplary information processing apparatus having a function of performing an authentication administration for a user who use the image processing apparatus 10.

The log administration apparatus 30 is an exemplary information processing apparatus having a function of performing a log administration for a job (performed image processing) performed by the image processing apparatus 10.

The upper limit administration apparatus 40 is an exemplary information processing apparatus having a function of performing an upper limit administration of a job, which is performed in the image forming apparatus by the user, based on log information administered in the log administration apparatus 30. Thus, the upper limit administration apparatus 40 performs the upper limit administration of the job performed by the user when the upper limit administration apparatus 40 operationally collaborates with the log administration apparatus or the like.

As described below, the upper limit administration of the first embodiment is administered by an upper limit point value set for each group formed by at least one user and additional point value set for each user. Each user determines whether a current point value, which indicates an accumulated total of the use amount of the image forming apparatus 10 used by the user, exceeds a sum of the upper limit point value set for the group of the user and the additional point value set for the user so as to perform the upper limit administration.

The PC terminal 50 is an exemplary information processing apparatus used by a user (an administrator user) who is an administrator of the information processing system 1. The administrator user of the information processing system 1 can set the additional point value for a user (an ordinary user) using the image forming apparatus 10 by operating the PC terminal 50.

The structure of the information processing system 1 is an example and is not limited to the above described structure. For example, in the information processing system 1, a part or all of the functions of the authentication administration apparatus 20, the log administration apparatus 30, and the upper limit administration apparatus 40 may be performed by the image forming apparatus 10. Further, one image forming apparatus 10 may perform the functions of the authentication administration apparatus 20, the log administration apparatus 30, and the upper limit administration apparatus 40.

Further, in the information processing system 1, the functions of the authentication administration apparatus 20, the log administration apparatus 30, and the upper limit administration apparatus 40 may be performed by one image forming apparatus or multiple image forming apparatuses.

<Hardware Structure>

Next, the hardware structure of the information processing system 1 of the first embodiment is described.

<<Authentication Administration Apparatus, Log Administration Apparatus, Upper Limit Administration Apparatus, and PC Terminal>>

Figure 2:
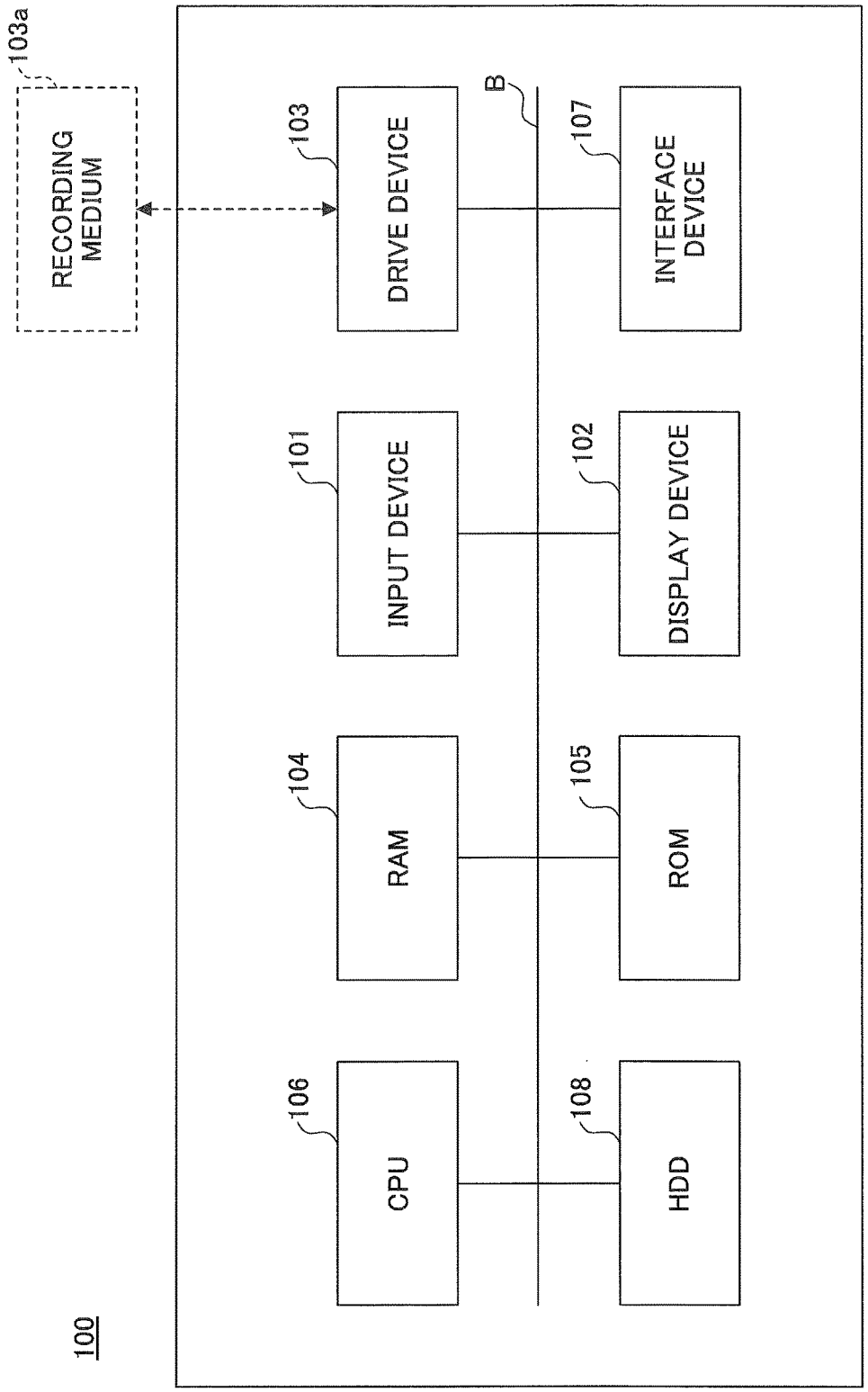
FIG. 2 illustrates a hardware structure of an exemplary computer of the embodiment.

The authentication administration apparatus 20, the log administration apparatus 30, the upper limit administration apparatus 40, and the PC terminal 50 of the first embodiment are substantialized by a computer 100 having the hardware structure as illustrated in, for example. FIG. 2 illustrates the hardware structure of an exemplary computer of the embodiment. Referring to FIG. 2, the information processing apparatus 100 includes an input device 101, a display device 102, a drive device 103, a random access memory (RAM) 104, a read only memory (ROM) 105, a central processing unit (CPU) 106, an interface device 107, and a hard disk drive (HDD) 108, which are mutually connected via a bus B.

The input device 101 may include a keyboard and a mouse, which are used to input various operation signals to the computer 100. The display device 102 includes a display or the like to display a processing result obtained by the computer 100. The input device 101 and/or the display device 102 may be formed so as to be attached to the computer 100 when necessary.

The interface device 107 is an interface for connecting the computer 100 to the network N. Therefore, the computer 100 can perform data communication with the image processing apparatus 10 or the like through the interface device 107.

The HDD 108 is a non-volatile memory device storing various programs and data. The stored program and data are an operating system (OS), which is basic software controlling the entire computer system 100, application software providing various functions in the OS, and so on. Further, the HDD 108 administers the stored program and the stored data using a predetermined file system and/or a predetermined data base (DB). The computer 100 may have a memory device such as a solid state drive (SSD) in place of the HDD or together with HDD.

The drive device 103 is an interface with a detachable recording medium 103a or the like. With this, the computer 100 can read information from the recording medium 103a and/or write information to the recording medium 103a. The recording medium 103a includes a flexible disk, a CD, a digital versatile disk (DVD), an SD Memory card, a universal serial bus (USB) memory, or the like.

The ROM 105 is a non-volatile semiconductor memory (a memory device) which can hold program and/or data even when the ROM 105 is powered off. The ROM 105 stores programs and data for a basic input/output system (BIOS), OS setup, network setup, or the like, which are executed at a time of booting up the computer 100. The RAM 104 is a volatile semiconductor memory (a memory device) temporarily storing programs and/or data.

The CPU 106 reads the program and/or data from the memory device such as the ROM 105, the HDD 108, or the like. The read program or the read data undergo a process so as to perform a control or a function of the entire computer 100.

The authentication administration apparatus 20, the log administration apparatus 30, the upper limit administration apparatus, and the PC terminal 50 can perform the various processes described below by the computer 100 having the above hardware structure.

<<Image Forming Apparatus>>

Figure 3:
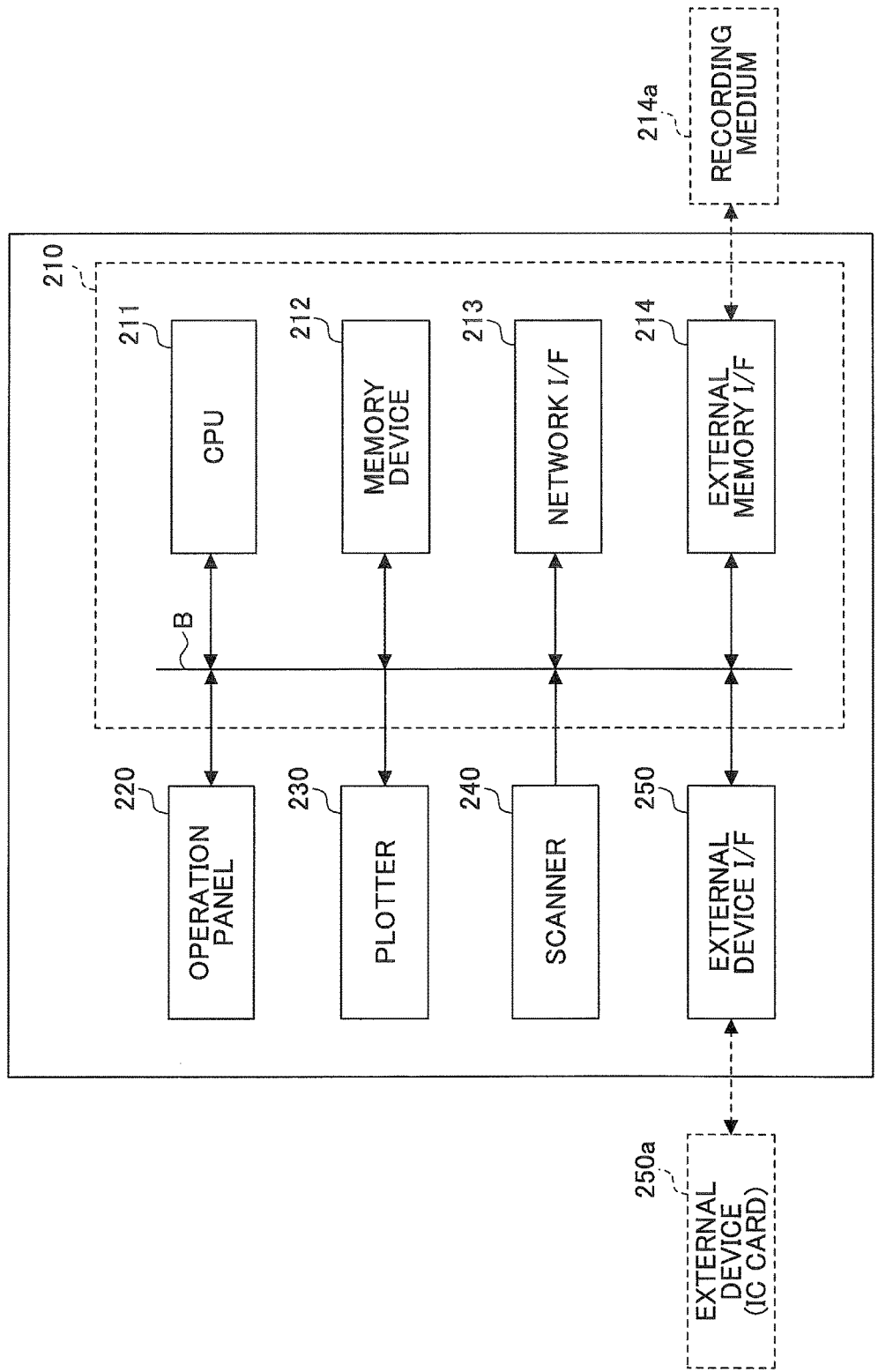
FIG. 3 illustrates a hardware structure of an exemplary image forming apparatus of the first embodiment.

The image forming apparatus 10 of the first embodiment is substantialized by the hardware structure illustrated in, for example, FIG. 3. FIG. 3 illustrates an exemplary hardware structure of the image forming apparatus 10 of the first embodiment. The image forming apparatus 10 illustrated in FIG. 3 includes a controller 210, an operation panel 220, a plotter 230, a scanner 240, an external device I/F 250, and a bus B mutually connecting these.

The operation panel 220 includes an input unit such as a touch panel in addition to a display unit. The operation panel 220 provides various information of the image forming apparatus 10 to users and receives various users' operations such as operation setting and operation instruction.

The plotter 230 includes an image forming unit for forming an output image on a paper. For example, a method of forming an output image may be an electrophotography method and an ink jet method. The scanner 240 optically reads an original manuscript and produces a read image.

The external device I/F 250 is an interface of reading memory information from the external device 250a. The external device 250a may be a contactless integrated circuit (IC) card such as a smart card. The external device I/F 250 can read information of ID information (a card ID) stored in the external device 250a using, for example, radio frequency identification (RFID).

The controller 210 has a CPU 211, a memory device 212, a network I/F 213, an external memory I/F 214, and a bus B mutually connecting these.

The CPU 211 performs various functions and controls the entire image forming apparatus 10 by executing the program. The memory device 212 stores and holds the program and the various data such as image data. The memory device 212 may be a RAM being a volatile memory, a ROM being a non-volatile memory, and a HDD having a large capacity memory region. The RAM functions as a work area of the CPU 211. The work area is a memory area from which the programs and data are temporarily read out. The ROM and the HDD are used as destinations of storing the programs and various data. In the image processing apparatus 10, the CPU 211 reads the program stored in the ROM onto the RAM and executes the program.

The communication I/F 213 is an interface provided to connect the image forming apparatus 10 with the network N. Thus, the image forming apparatus 10 can perform data communication with the authentication administration apparatus 20 and the log administration apparatus 30 through the network I/F 213.

The external memory I/F 214 is an interface for connecting the recording medium 214a as an external memory. With this, the image processing apparatus 10 can read or write data from the recording medium 214a via the external memory I/F 214.

The image forming apparatus 10 of the first embodiment can perform various processes described below with the above hardware structure. Described above is the case where the image forming apparatus 10 is the MFP. For example, in a case where the image forming apparatus 10 is a printer, the hardware structure does not include the scanner 240.

<Functional Structure>

Figure 4:
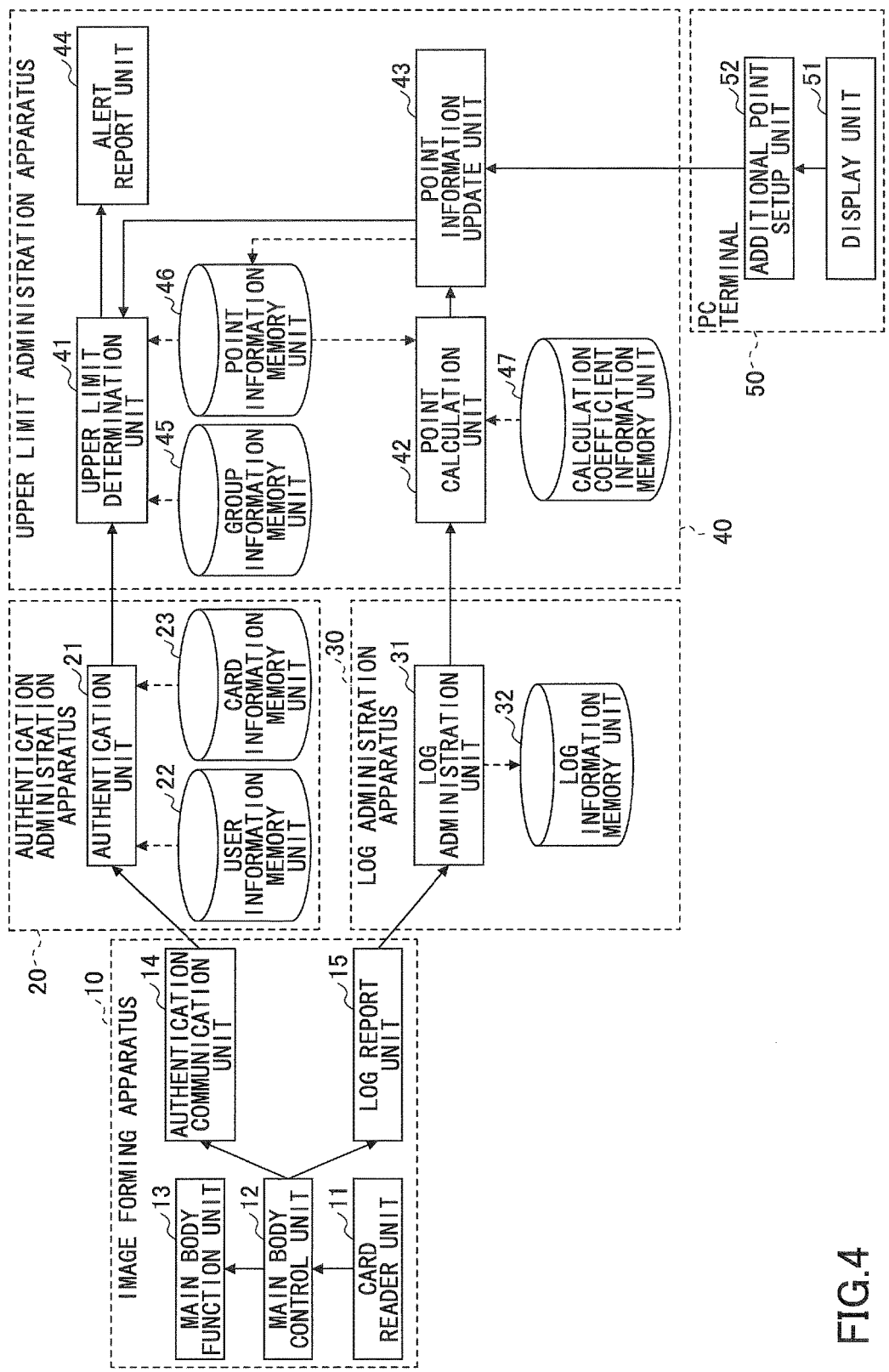
FIG. 4 illustrates a functional block diagram of an exemplary information processing system of the first embodiment.

Next, a functional structure of the information processing system 1 of the first embodiment is described. The information processing system 1 of the first embodiment is substantialized by a functional block illustrated in, for example, FIG. 4. FIG. 4 is a functional block diagram of an exemplary information processing system of the first embodiment.

<<Image Forming Apparatus>>

Referring to FIG. 4, the image forming apparatus 10 includes a card reader unit 11, a main body control unit 12, a main body function unit 13, an authentication communication unit 14, and a log report unit 15.

The card reader unit 11 is substantialized by, for example, the CPU 211 and the external device I/F 250 so as to read information (e.g., a card ID) stored in the external device 250a such as an IC card.

In response to a request received from functional units, the main body control unit 12 requests other functional units to perform a process. For example, the main body control unit 12 requests the authentication communication unit 14 to perform a process in response to an authentication request from the card reader unit 11.

The main body function unit 13 is substantialized by, for example, the CPU 211, the plotter 230, and the scanner 240, and performs various functions such as a copy function, a print function, and a scan function in response to a request from the main body control unit 12. Said differently, the main body function unit 13 performs a job (requested image processing) requested from the user.

The authentication communication unit 14 is substantialized by, for example, the CPU 211 and the network I/F 213 so as to send an authentication request to the authentication unit 21 of the authentication administration apparatus 20 in response to a request from the main body control unit 12.

The log report unit 15 is substantialized by, for example, the CPU 211 and the network I/F 213 so as to send a log (an execution log) of a function (a performed job) performed by the main body function unit 13 to the log administration unit 31 of the log administration apparatus 30 in response to a request from the main body control unit 12.

<Authentication Administration Apparatus>

Referring to FIG. 4, the authentication administration apparatus 20 includes an authentication unit 21. Further, the authentication administration apparatus 20 uses a user information memory unit 22 and a card information memory unit 23.

The authentication unit 21 is substantialized by, for example, the CPU 211 so as to authenticate based on an authentication request received from the authentication communication unit 14 of the image forming apparatus 10. The authentication unit 21 requests an upper limit determination unit 41 of the upper limit administration apparatus 40 to determine whether the usage amount (a current point value) of the authenticated user reaches an upper limit.

The user information memory unit 22 is substantialized by, for example, the HDD 108 or the memory device connected to the authentication administration apparatus 20 through the network N so as to store user information 22D which is information related to the users. The user information 22D will be described in detail.

The card information memory unit 23 is substantialized by, for example, the HDD 108 or the memory device connected to the authentication administration apparatus 20 through the network N so as to store card information 22D which is information related to the external device 250a such as an IC card. The card information 23D will be described in detail.

<<Log Administration Apparatus>>

Referring to FIG. 4, the log administration apparatus 30 includes a log administration unit 31. The log administration apparatus 30 uses a log information memory unit 32.

The log administration unit 31 is substantialized by, for example, the CPU 106 so as to cause the execution log received from the log report unit 15 of the image forming apparatus 10 to be stored in the log information memory unit 32. The log administration unit 31 requests the point calculation unit 42 of the upper limit administration apparatus 42 to calculate the usage amount of the received execution log.

The log information memory unit 32 is substantialized by, for example the HDD 108 or the memory device connected to the authentication administration apparatus 20 through the network N so as to store log information 32D which is accumulated total of the execution log received from the image forming apparatus 10. The log information 32D will be described in detail.

<<Upper Limit Administration Apparatus>>

Referring to FIG. 4, the upper limit administration apparatus 40 includes an upper limit determination unit 41, a point calculation unit 42, a point information update unit 43, and an alert report unit 44. Further, the upper limit administration apparatus 40 uses a group information memory unit 45, a point information memory unit 46, and a calculation coefficient information memory unit 47.

The upper limit determination unit 41 is substantialized by, for example, the CPU 106 so as to determine whether the accumulated total of the usage amount (the current point value) of the corresponding user reaches the upper limit in response to the request from the authentication administration apparatus 20. Further, in a case where the result of the determination indicates that the accumulated total of the usage amount reaches the upper limit, the upper limit determination unit 41 requests the alert report unit 44 to report an alert.

The point calculation unit 42 is substantialized by, for example, the CPU 106 so as to calculate a usage amount of the received execution log in response to the request from the log administration apparatus 30.

The point information update unit 43 is substantialized by, for example, the CPU 106 so as to update the current point value of the corresponding user, which is stored in the point information memory unit 46, based on the calculated usage amount calculated by the point calculation unit 42. Further, the point information update unit 43 updates the additional point value of the corresponding user, which is stored in the point information update unit 43 based on the additional point value of the corresponding user set by an additional point setup unit 52 (described later) of the PC terminal 50.

The alert report unit 44 is substantialized by, for example, the CPU 106 and the interface device 107 so as to report an alert to, for example, the PC terminal 50 in response to a request from the upper limit determination unit 41.

The group information memory unit 45 is substantialized by, for example, the HDD 108 or the memory device connected to the upper limit administration apparatus 40 through the network N so as to store group information 45D which is provided to administer the upper limit point value set for each group. The group information 45D will be described in detail.

The point information memory unit 46 is substantialized by, for example, the HDD 108 or the memory device connected to the upper limit administration apparatus 40 through the network N so as to store point information 46D which is provided to administer the current point value for each user and the additional point value for each user. The point information 46D will be described in detail.

The calculation coefficient information memory unit 47 is substantialized by, for example, the HDD 108 or the memory device connected to the upper limit administration apparatus 40 through the network N so as to store calculation coefficient information 47D which is used by the point calculation unit 42 to calculate the usage amount. The calculation coefficient information 47D will be described in detail.

<<PC Terminal>>

Referring FIG. 4, the PC terminal 50 includes a display unit 51 and an additional point setup unit 52.

The display unit 51 is substantialized by, for example, the CPU 106 and the display device 102 so as to display a processing result obtained by the PC terminal 50. For example, the display unit 51 causes the display device 102 to display a "setup screen of the additional point" provided for the user to set the additional point value using the additional point setup unit 52.

The additional point setup unit 52 is substantialized by, for example, the CPU 106 so as to set the additional point value for the user. This additional point value can be set using the above "setup screen of the additional point". When the additional point value is set by the additional point setup unit 52, the additional point value of the corresponding user is updated through the point information update unit 43 of the upper limit administration apparatus 40.

Described next are various data used by the information processing system 1.

<<User Information>>

FIG. 5 illustrates a structure of exemplary user information. Referring to FIG. 5, the user information 22D includes a "user name" for uniquely identifying the user of the information processing system 1, a "password" used for authenticating the corresponding user, a "group name" to which the corresponding user belongs. As described, in the user information 22D, the user name, the authentication password of this user, and the group to which this user belongs are associated.

<<Card Information>>

FIG. 6 illustrates a structure of exemplary card information. Referring to FIG. 6, the card information 23D includes a "card ID" for uniquely identifying an IC card which is an example of the external device 250a and a "user name" indicating the rightful user of the IC card. As described, in the card information 23, the card ID and the user name of the user of the IC card having this card ID are associated. The user can have multiple IC cards. In this case, one of the user names is stored in association with different card IDs.

<<Log Information>>

FIG. 7 illustrates a structure of exemplary log information. Referring to FIG. 7, the log information 32D includes a "log ID" for uniquely identifying an execution log, an "operation date and hour" indicating a date and a hour when the function corresponding to this execution log is performed, a "log kind" indicative of a kind of the performed function, and a "user name" indicating the user who performs the function. Further, the log information includes a "card ID" indicating the card ID used by the corresponding user, a "color/monochrome" indicating whether a performed function (e.g., printing) is color printing and monochrome printing, and a "page number" indicative of the page number at which the function is performed. The log information may further have a data item such as "duplex/simplex" indicating that the function (e.g., print) is subjected to a duplex print or a simplex print and "aggregation" indicating that the function (e.g., print) is subjected to an aggregation print.

As described, the log information 32D of the first embodiment is a log (an execution log) for each job performed by the user. However, the log information is not limited to the above and may be a log for each page for which the function is performed. In a case where the log information for each page is used, a more accurate usage amount is calculated by the point calculation unit 42. Therefore, in this case, the upper limit of the usage amount of the user can be more accurate.

<<Group Information>>

FIG. 8 illustrates a structure of exemplary group information. Referring to FIG. 8, the group information 45D includes a "group name" for uniquely identifying the group and an "upper limit point value" indicating the upper limit of the usage amount set for the group. As described, the upper limit point value indicating the upper limit of the usage amount for each group is set. Therefore, each user of the information processing system 1 of the first embodiment is subjected to the upper limit administration based on (with reference to) the upper limit point value set to the group, to which the user belongs, and the additional point value described below.

<<Point Information>>

FIG. 9 illustrates a structure of exemplary point information. Referring to FIG. 9, the point information 46D includes a "user name" for uniquely identifying the user of the information processing system 1, a "current point value" indicating the accumulated total of the usage amount of the image forming apparatus 10 used by the user up to the present date, and a "additional point value" indicating a point added to the upper limit point value for the user. As described above, the additional point value is set in addition to the current point value for each user. With this, the users who are not provided with the additional point (the additional point value is 0) are uniformly subjected to the upper limit administration using the upper limit point value set to the group across the users. Meanwhile, the users who are provided with the additional point (the additional point value is 0) are subjected to the upper limit administration further using each additional point value. Said differently, the administrator user of the information processing system 1 sets the upper limit point value uniformly across the groups so as to relieve the time and effort for the upper limit administration and the additional point value for the user is set so as to perform a flexible upper limit administration while considering an actual usage result or the like of the user.

<<Calculation Coefficient>>

FIG. 10 illustrates a structure of exemplary calculation coefficient information. Referring to FIG. 10, the calculation coefficient information 47D includes a "group name" for uniquely identifying the group, a "color print" indicating the calculation coefficient in a case where a color print is done, a "color copy" indicating the calculation coefficient in a case where a color copy is done, a "monochrome print" indicating the calculation coefficient in a case where a monochrome print is done, and a "monochrome copy" indicating the calculation coefficient in a case where a monochrome copy is done. The calculation coefficient information 47D may further include data items indicating calculation coefficients for the various functions of the image forming apparatus 10 such as a "duplex print" indicating the calculation coefficient in a case where a duplex print is done, and a "duplex copy" indicating the calculation coefficient in a case where a duplex copy is done.

The usage amount of the execution log is calculated by the point calculation unit 42 using this calculation coefficient information 47D. For example, color copies of 10 pages are done by a user belonging to "design 1G", the usage amount is calculated by the point calculation unit as 10 (pages)×5 (the calculation coefficient)=50. This usage amount is added to the current point value of the corresponding user by the point information update unit 43.

Referring to FIG. 10, a flexible upper limit administration can be performed in terms of the group by using calculation coefficients different for each group. For example, in a case where "sales 1G" uses more color copy than "design 1G", the calculation coefficient of the color copy for the "sales 1G" is set to be smaller than the calculation coefficient of the color copy for the "design 1G". Thus, the upper limit administration can be performed while considering a need in a business content for each group.

<Detailed Process>

Next, a detailed process of the information processing system 1 of the first embodiment is described. Hereinafter, the user (the ordinary user) who uses the image forming apparatus 10 in the information processing system 1 is designated by "user U1", and the user (the administrator user) who is the administrator of the information processing system 1 is designated by "user U2".

<<Process from Login to use of Function>>

Figure 11:
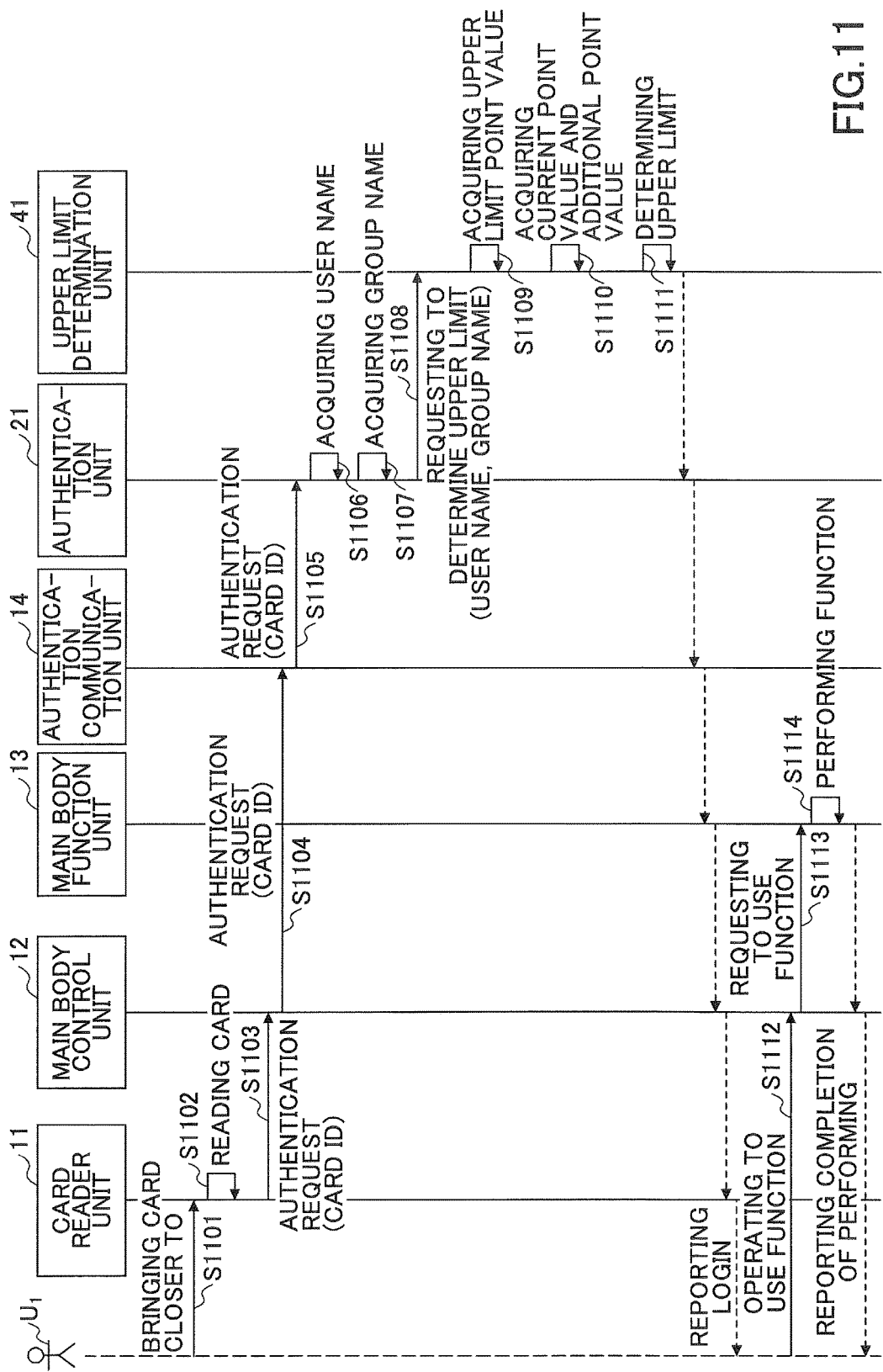
FIG. 11 illustrates a sequence chart of an exemplary process from a login to a use of function of the first embodiment.

Described first is processes where the user U1 logs in the image forming apparatus 10 and uses a function such as a copy function of the image forming apparatus 10. FIG. 11 is a sequence chart of an exemplary process from a login to a use of function of the first embodiment.

The user U1 brings an IC card (the external device 250a) whose rightful user is the user U1 closer to a predetermined position (a position where information recorded in the IC card can be read) of the image forming apparatus 10 in order to log in the image forming apparatus 10 (step S1101). Then, the card reader unit 11 of the image forming apparatus 10 acquires information (the card ID) recorded in the IC card (step S1102), and sends an authentication request including the acquired card ID to the main body control unit 12 (step S1103).

In the above step S1101, the user U1 may input the user name and the password using the operation panel 220 in order to log in the image forming apparatus 10. In this case, the main body control unit 12 sends the authentication request including the input user name and the input password to the authentication communication unit 14 in the following step S1104.

The main body control unit 12 of the image forming apparatus 10 transfers the authentication request to the authentication communication unit 14 when the main body control unit 12 receives the authentication request (step S1104). Then, the authentication communication unit 14 sends the authentication request to the authentication unit 21 of the authentication administration apparatus 20 (step S1105).

The authentication unit 21 of the authentication administration apparatus 20 refers to the card information 23D and acquires the user name associated with the card ID included in the received authentication request (step S1106). For example, in a case where the card ID included in the authentication request is "C0002", the authentication unit 21 acquires the user name of "yamashita". In a case where the user name associated with the card ID included in the authentication request does not exist in the card information 23D, the authentication unit 21 returns information indicative of an authentication failure to the image forming apparatus 10.

In a case where the user U1 inputs the user name and the password using the operation panel 220 in the above step S1101, the authentication unit 21 determines whether the user information 22D includes a set matching with the set of the user name and the password. In a case where the corresponding set of the user name and the password does not exist in the user information 22D, the authentication unit 21 returns the information indicating the authentication failure to the image forming apparatus 10.

Next, the authentication unit 21 refers to the user information 22D and acquires the group name associated with the acquired user name (step S1107). For example, in a case where the user name "yamashita" is acquired in the above step S1106, the authentication unit 21 acquires the group name of "design 1G".

Then, the authentication unit 21 sends an upper limit determination request including the acquired user name and the acquired group name to the upper limit determination unit 41 of the upper limit administration apparatus 40 (step S1108).

The upper limit determination unit 41 of the upper limit administration apparatus 40 refers to the group information 45D and acquires an upper limit point value associated with the group name included in the received upper limit determination request (step S1109). For example, in a case where the group name included in the upper limit determination request is "design 1G", the upper limit determination unit 41 acquires the upper limit point value of "1000".

Further, the upper limit determination unit 41 refers to the point information 46D and acquires the current point value and the additional point value which are included in the received upper limit determination request and associated with the user name (step S1110). For example, the user name included in the upper limit determination request is "yamashita", the upper limit determination unit 41 acquires the current point value of "200" and the additional point value of "300".

Then, the upper limit determination unit 41 determines the upper limit based on the acquired current point value, the acquired upper limit point value, and the acquired additional point value (step S1111). Said differently, for example, the upper limit determination unit 41 determines whether the current point value is equal to or greater than the sum of the upper limit point value and the additional point value or not. The determination done by the upper limit determination unit 41 is not limited to this. For example, it may be determined whether the current point is equal to or greater than a predetermined ratio (for example, 80%) of the sum of the upper limit point value and the additional point value or not. Said differently, the upper limit determination unit 41 determines whether the current point value is equal to or greater than (or is greater than) a threshold determined based on the sum of the upper limit point value and the additional point value or not (the upper limit determination unit 41 determines whether the usage amount of the user U1 reaches the upper limit). This predetermined threshold is a choice in a design. The user U2 (the administrator user) may periodically review the predetermined threshold in consideration of usage conditions of each user U1 and set to be a predetermined value.

Thereafter, the upper limit determination unit 41 returns the result of the determination to the authentication unit 21 of the authentication administration apparatus 20. In a case where the result of the determination received from the upper limit determination unit 41 is smaller than the predetermined threshold (or does not exceed the predetermined threshold), the authentication unit 21 returns information indicative of a login success to the image forming apparatus 10. With this, the user U1 logs in the image forming apparatus 10 to be enabled to perform various functions of the image forming apparatus 10 as described later.

In a case where the result of the determination received from the upper limit determination unit 41 is equal to or greater than the predetermined threshold (or exceed the predetermined threshold), the authentication unit 21 returns information indicating that the usage amount reaches the upper limit to the image forming apparatus 10. In this case, the user U1 may be prohibited to use the image forming apparatus 10 or the function of the image forming apparatus 10 may be restricted (for example, a color print and a color copy are prevented from being used). Alternatively, the alert report unit 44 reports an alert to the PC terminal 50 to notify the user U2 who is the administrator that the usage amount of the user U1 reaches the upper limit. Said differently, in the case where the result of the determination in the upper limit determination unit 41 indicates that the usage amount of the user U1 reaches the upper limit 41, the information processing system 1 can choose an operation, and the operation is determined by, for example, the user U2 who is the administrator.

Next the user U2 operates to use a predetermined function (for example, a copy function) through the operation panel 220 of the image forming apparatus 10 (step S1112). For example, in a case where the user U1 uses the copy function, the user U1 sets an original manuscript to the image forming apparatus 10, does a predetermined setup such as the number of copies and the output size, and performs a copy start (execution) operation.

When the main body control unit 12 of the image forming apparatus 10 receives the operation to use the function from the user U1, the main body control unit 12 sends a request to use the corresponding function to the main body function unit (step S1113). When the main body function unit 13 receives the request to use the function, the main body function unit 13 performs the corresponding function (for example, a copy function) in accordance with the setup designated by the user U1 (step S1114). Then, the main body function unit 13 displays a report indicating that the function is completely performed on, for example, the operation panel of the image forming apparatus 10 when the function requested by the user is completely performed. Thus, the user U1 can know that the performance of the function requested by the user U1 is completed.

When the function is performed by the main body function unit 13 in the above step S1114, the plotter 230 and the scanner 240 outputs the execution log of the performed function. The execution log output here is stored in a predetermined memory region of the image forming apparatus 10 and is sent to the log administration apparatus 30 by the log report unit 15 in a logout process for the user U1 described later.

<<Logout Process>>

Figure 12:
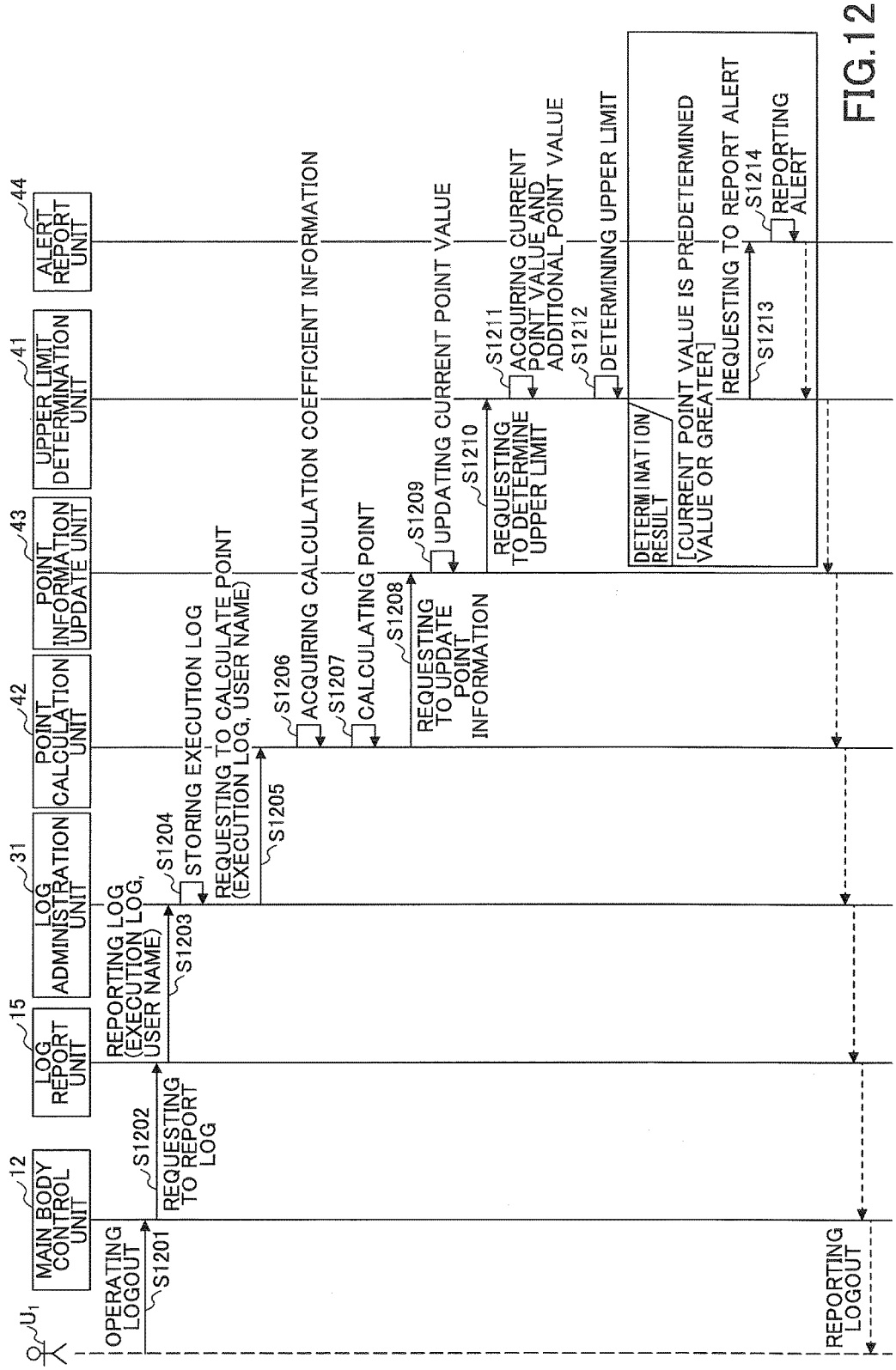
FIG. 12 is a sequence chart of an exemplary logout process of the first embodiment.

Described next is a logout process performed after the user U1 ends the use of the image forming apparatus 10. FIG. 12 is a sequence chart of an exemplary logout process of the first embodiment.

The user U1 operates (a logout operation) to log out of the image forming apparatus 10 through the operation panel 220 of the image forming apparatus (step S1201). The main body control unit 12 requires the log report unit 15 to report a log (the execution log) of the function performed while the user logs in the image forming apparatus 10 when the logout operation of the user U1 is operated (step S1202). When the log report unit 15 receives the request to report the execution log, the log report unit 15 acquires the execution log of the function performed by the corresponding user (the user U1) during the login, and sends the log report including the acquired execution log and the user name of the user to the log administration unit 31 of the log administration apparatus 30 (step S1203).

The log administration unit 31 of the log administration apparatus 30 adds the execution log included in the log report received from the image forming apparatus to the log information 32D (step S1204). With this the execution log is stored in the log information memory unit 32 and administered by the log administration apparatus 30. Then, the log administration unit 31 sends a point calculation request including the execution log and the user name of the user U1 to the point calculation unit 42 of the upper limit administration apparatus 40 (step S1205).

When the point calculation unit 42 of the upper limit administration apparatus 40 receives the point calculation request, the point calculation unit 42 acquires a calculation coefficient of the corresponding group from the calculation coefficient information memory unit 47 (step S1206). For example, in a case where the user name included in the point calculation request is "yamashita", the calculation coefficients (the first record in the calculation coefficient information 47D) of "design 1G" to which the user belongs are acquired.

The point calculation unit 42 calculates the point (the usage amount) based on the execution log included in the point calculation request and the acquired calculation coefficient (step S1207). For example, in a case where the execution log is that of the log ID of "6" in the log information 32D (when monochrome copies of 20 pages are performed), because the calculation coefficient is "1", the usage amount is calculated as 20 (pages)×1 (the calculation coefficient)=20 (the usage amount). As another example, in a case where the user of "sales 1G" performs color prints of 10 pages, the usage amount is calculated as 10 (pages)×5 (the calculation coefficient)=50 (the usage amount).

The point calculation unit 42 sends an update request including the point (the usage amount) calculated in the above step S1207 and the user name of the user U1 to the point information update unit (step S1208).

The point information update unit 43 updates the current point value of the user U1 in the point information 46D to be a value obtained by adding the calculated point to the current point value (step S1209). For example, the user name is "yamashita" and the calculated point (the usage amount) is "20", the current point value of "200" of the user name "yamashita" in the point information 46D is updated to be "220". Then, the point information update unit 43 sends a determination request to determine the upper limit based on the updated current point value to the upper limit determination unit 41 (step S1210).

The upper limit determination unit 41 refers to the point information 46D and acquires the current point value of the user U1 updated in step S1209 and the additional point value (step S1211). For example, the user name is "yamashita", the upper limit determination unit 41 acquires the updated current point value of "220" and the additional point value of "300".

Then, the upper limit determination unit 41 determines the upper limit based on the acquired and updated current point value, the acquired upper limit point value, and the acquired additional point value (step S1212). Here, the upper limit determination is a process similar to the process described in step S1111 of FIG. 11. However, the upper limit determination unit 41 may further determine whether predetermined days lapse from a predetermined reference date.

For example, the upper limit determination unit 41 may further determine whether 15 days or more lapse from the beginning of a month. In a case where the lapsed days are more than a predetermined threshold and 15 days or more does not lapse from the beginning of the month, a report request of the alert may be sent to the alert report unit 44 in the following step S1213. With this, in a case where the current point value is counted on a monthly basis (said differently, in a case where the current point value is cleared at the beginning of a month (initialization), the alert may be reported only for the user whose usage amount reaches a predetermined threshold. The time period while the current point value is counted is not limited to the monthly basis, and may be a weekly basis, a yearly basis, or the like.

Further, in the upper limit determination unit 41, the predetermined threshold may be changed in response to this time period. For example, the predetermined threshold may be 60% of the sum of the upper limit point value and the additional point value at the beginning of the month, the predetermined threshold may be 70% of the sum of the upper limit point value and the additional point value at the middle of the month, and the predetermined threshold may be 80% of the sum of the upper limit point value and the additional point value at the ending of the month. The threshold in step S1111 of FIG. 11 may be modified in a manner similar thereto.

In a case where the result of the determination of the upper limit determination is equal to or greater than the predetermined threshold (or exceeds the predetermined threshold), the upper limit determination unit 41 sends the report request of the alert to the alert report unit 44 (step S1213). The alert report unit 44 performs the alert report to, for example, the PC terminal 50 (step S1214). For example, the image forming apparatus 10 causes a report indicative the completion of the logout of the user U1 to be displayed on the operation panel 220.

As described above, the alert (an alarm screen) indicating that the usage amount of the user U1 reaches the upper limit value is displayed on the display device 102 by the display unit 51 of the PC terminal 50, for example. Therefore, the user U2 who is the administrator can set the additional point value for the user U1 in response to the alert as described in, for example, a setup process of the additional point value described below. As described, the alert is reported to the user U2 who is the administrator in the case where the usage amount of the user U1 reaches the upper limit. How to deal with the alert by the user U2 can be chosen as an operation. Therefore, in place of the setup of the additional point value, for example, various measures may be adopted, for example, the account of the user U1 may be stopped, the function usable by the user U1 may be restricted, the user U1 may be informed by a telephone or a mail so as to reduce the usage.

<<Setup Process of Additional Point Value>>

Figure 13:
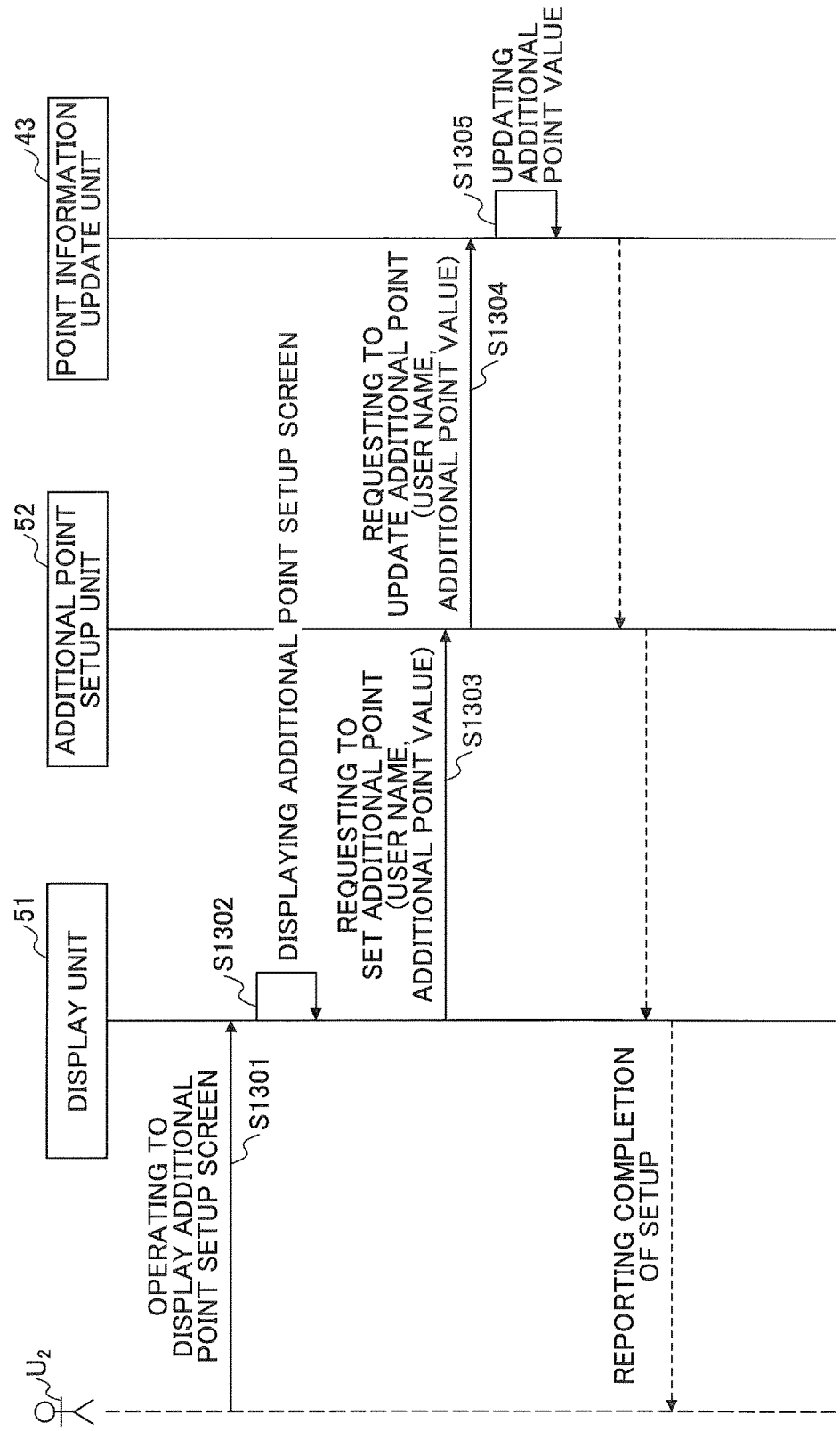
FIG. 13 is a sequence chart of an exemplary additional point value setup process of the first embodiment.

Described next is a process that the user U2 who is the administrator sets the additional point value to the user U1 using the PC terminal 50. This additional point may be set in a case where the usage amount of the user U1 reaches the upper limit as described above or may be set when the user U1 requests so. Said differently, the additional point value can be set by the user U2 at a desired timing. FIG. 13 is a sequence chart of an exemplary additional point value setup process of the first embodiment.

Figure 14:
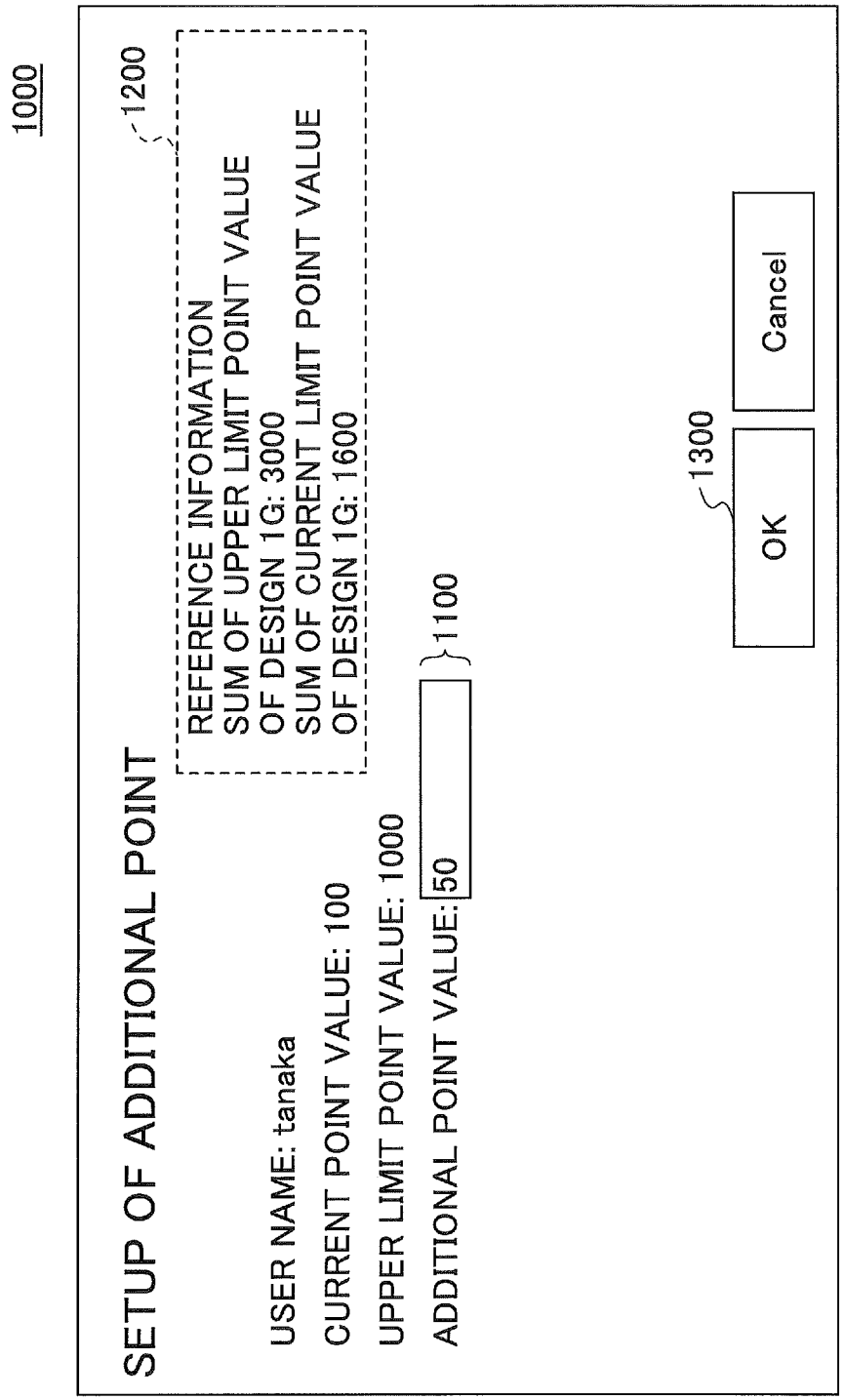
FIG. 14 is an image chart of an exemplary additional point setup screen.

The user U2 performs an operation of causing a screen for setting the additional point value to the desired user to be displayed by the PC terminal 50 (step S1301). For example, it is possible to display the screen for setting the additional point value by selecting the desired user on a screen of a user view or the like of the information processing system 1. Then, the display unit 51 of the PC terminal 50 display setup screen 1000 for the additional point illustrated in, for example, FIG. 14 (step S1302). The setup screen 1000 for the additional point illustrated in FIG. 14 is a screen for setting the additional point value to the user name "tanaka". In the setup screen 1000 for the additional point illustrated in FIG. 14, the user U2 inputs the additional point value ("50" in the example illustrated in FIG. 14) which is required to be set in the user name "tanaka" and pushes an OK button 1300 so as to set the additional point value.

The setup screen 1000 for the additional point may display reference information. The reference information 1200 is information referred to by the user U2 when the additional point value set to the user is determined. The reference information 1200 includes and indicates the sum of the upper limit point values of all the users of the group of "design 1G" to which the user name of "tanaka" belongs and the sum of the current point value of all the users of the group of "design 1G". According to the reference information 1200, for example, the entire "design 1G" can use 1400 points obtained as the sum of 3000 of the upper limit point values—the sum of 1600 the current point values=1400 points. Therefore, the user U2 can appropriately set the additional point value to the desired user by referring to the reference information 1200.

Ordinarily, in a case where the number of the users belonging to the group is great, it takes time and effort for the administrator to know how much the usage amount of the entire group is and how much the current usage amount of the entire group. Therefore, in a case where the reference information described above is not displayed, the administrator may set inappropriately excessive additional point value to the corresponding user. Within the first embodiment, the administrator can appropriately set the additional point value by causing the reference information to be displayed on the above the setup screen 1000 for the additional point.

When the user U2 sets the additional point value to the corresponding user, the display unit 51 sends a setup request, which is provided for setting the additional point and includes the corresponding user name and the additional point value, to the additional point setup unit 52 (step S1303). Then, the additional point setup unit 52 sends an update request, which includes the corresponding user name and the additional point value, to the point information update unit 43 of the upper limit administration apparatus 40 (step S1304).

When the point information update unit 43 of the upper limit administration apparatus 40 receives the update request of updating the additional point value, the point information update unit 43 updates the additional point value for the corresponding user name (for example, "tanaka") to the set additional point value (for example, "50") in the point information 46D (step S1305). Information indicating that the setup of the additional point value is completed is reported to the display unit 51 of the PC terminal 50. The user who is the administrator of the information processing system 1 can set an individual additional point value for each ordinary user. With this, for example, the additional point value can be set for a user who uses the image forming apparatus 10 more than the other users for the convenience of business. Thus, a flexible upper limit administration can be performed.

The point information update unit 43 may clear (initialize) the additional point value set to the point information 46D for each predetermined time period (for example, beginning of each month). With this, the additional point value set to the user can be temporarily or tentatively. Said differently, the upper limit administration considering the additional point value while limiting the time period or the like for each user can be performed on the basis of the upper limit administration using the upper limit point value set for each group. Therefore, it is possible to perform the flexible upper limit administration where the additional point value is set for a user who is prospected to heavily use the image forming apparatus 10 for a certain time period for the convenience of business.

[Second Embodiment]

Next, the information processing system 1 of a second embodiment is described. Within the information processing system 1 of the second embodiment, in a case where an additional point value is set for a certain user, a correction point value is set for the other user in the same group, as a difference from the first embodiment.

Within the first embodiment, there may be a case where a use exceeding the sum of the upper limit point value of the entire group, to which a user belongs, is done as a result of setting the additional point value to this user. Within the second embodiment, in order to prevent the above use, in the case where the additional point value is set to a certain user, the correction point value is provided to restrict the use by the other users belonging to the group, to which the certain user belongs.

Hereinafter, portions having substantially the same functions as those of the first embodiment and portions performing substantially the same processes as those of the first embodiment are designated by the same reference symbols as those of the first embodiment, and description of these portions is omitted.

<Functional Structure>

Figure 15:
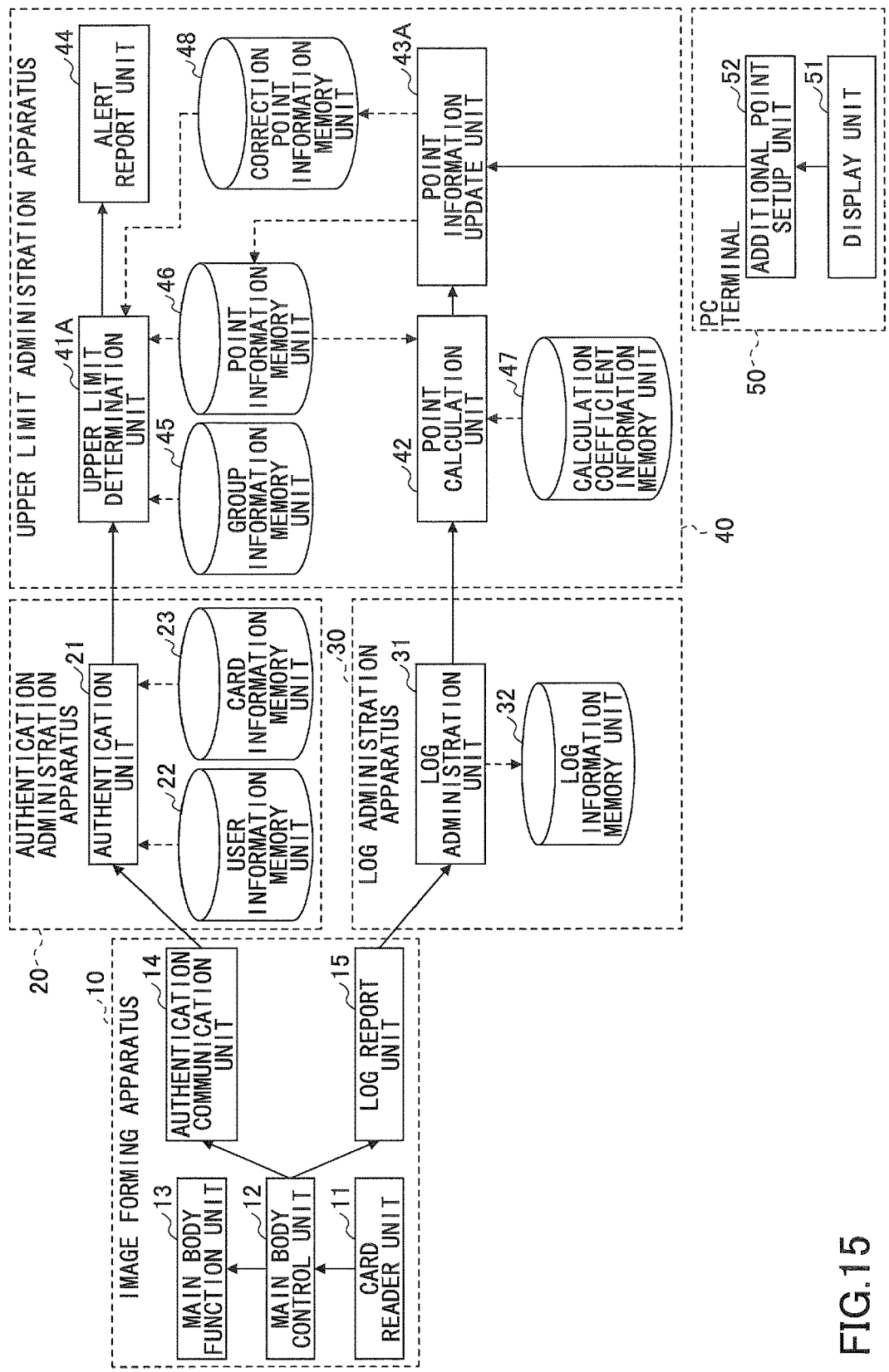
FIG. 15 illustrates a functional block diagram of an exemplary information processing system of a second embodiment.

The information processing system 2 of the second embodiment is described. The information processing system 2 of the second embodiment is substantialized by a functional block illustrated in, for example, FIG. 15. FIG. 15 is a functional block diagram of an exemplary information processing system of the second embodiment.

Referring to FIG. 15, the upper limit administration apparatus 40 of the second embodiment differs from that of the first embodiment at points that a correction point information memory unit 48 is provided and functions of an upper limit determination unit 41A and a point information update unit 43A are different. Therefore, the upper limit determination unit 41A and the point information update unit 43A are described.

The upper limit determination unit 41A is substantialized by, for example, the CPU 106 or the like, and determines whether the current point value reaches the upper limit based on a value obtained by subtracting a correction point value included in the correction point information 48D (described below) from the sum of the upper limit point value and the additional point value in addition to the function performed by the upper limit determination unit 41 of the first embodiment. Said differently, within the second embodiment, a second determination using the current point value of the corresponding user and the above described sum and a first determination using the current point value of the corresponding user and the value obtained by subtracting the correction point value from the above sum are performed.

The point information update unit 43A is substantialized by, for example, the CPU 106 or the like, and updates the correction point value of the corresponding user stored in the correction point information memory unit 48 in addition to the function performed by the point information update unit 43 of the first embodiment. Here, the corresponding user to be updated when the point information update unit 43A updates the correction point value stored in the correction point information memory unit 48 is a user who belongs to the same group as the group, to which the user set to have the additional point value, and to whom the additional point value is not set.

The correction point information memory unit 48 is substantialized by, for example, the HDD 108 or the memory device connected to the upper limit administration apparatus 40 through the network N so as to store correction point information 48D which is provided to correct the sum of the upper limit point value and the additional point value.

<<Correction Point Information>>

FIG. 16 illustrates a structure of exemplary correction point information. Referring to FIG. 16, the correction point information 48D includes the "user name" uniquely identifying the user and the "correction point value" indicating the correction point value set to the user. By using the correction point information 48D, the upper limit determination unit 41A determines whether the usage amount of the corresponding user reaches the upper limit.

<Detailed Process>

Next, a detailed process of the information processing system 1 of the second embodiment is described. Because the logout process is similar to the first embodiment, the description thereof is omitted.

<<Process from Login to use of Function>>

Figure 17:
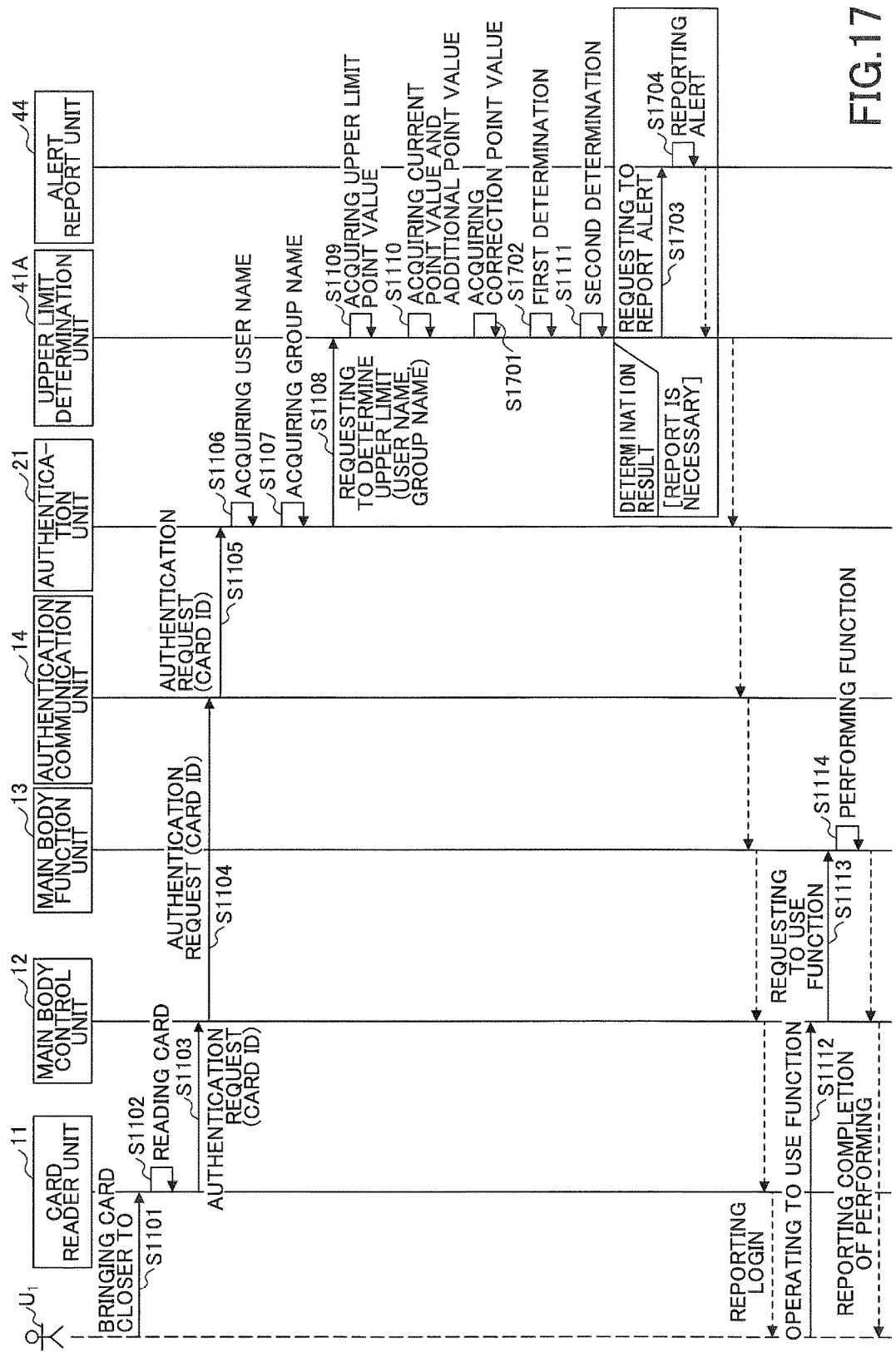
FIG. 17 illustrates a sequence chart of an exemplary process from a login to a use of function of the second embodiment.

FIG. 17 is a sequence chart of an exemplary process from a login to a use of function of the second embodiment. The process from the login to the use of function of the second embodiment differs from that of the first embodiment at processes of steps S1701 to S1704. Therefore, these processes of steps S1701 to S1704 are described below.

The upper limit determination unit 41A of the upper limit administration apparatus 40 refers to the correction point information 48D and acquires the correction point value associated with the user name included in the upper limit determination request (step S1701). For example, in a case where the user name included in the upper limit determination request is "yamashita", the upper limit determination unit 41 acquires the correction point value of "50".

Then, the upper limit determination unit 41A determines the upper limit (the first determination) based on the acquired current point value, the acquired upper limit point value, the acquired additional point value, and the acquired correction point value (step S1702). Said differently, for example, the upper limit determination unit 41A determines whether the current point value is equal to or greater than a value obtained by subtracting the correction point value from the sum of the upper limit point value and the additional point value or not. The determination done by the upper limit determination unit 41 is not limited to this. For example, it may be determined whether the current point is equal to or greater than a predetermined ratio (for example, 80%) of the value obtained by subtracting the correction point value from the sum of the upper limit point value and the additional point value or not. Said differently, the upper limit determination unit 41A determines whether the current point value is equal to or greater than (or greater than) a predetermined threshold obtained based on the value obtained by subtracting the correction point value from the above sum. This predetermined threshold is a choice in a design. The user U2 (the administrator user) may periodically review the predetermined threshold in consideration of usage conditions of each user U1 and set to be a predetermined value.

Thereafter, in a case where the result of the first determination indicates that the current point value is less than the predetermined threshold (or does not exceed the predetermined threshold) and the result of the second determination in step S1111 indicates that the current point value is less than the predetermined threshold (or does not exceed the predetermined threshold), the upper limit determination unit 41A returns information indicative of a successful login to the image forming apparatus 10. With this, the user U1 logs in the image forming apparatus 10 so as to be enabled to perform various functions of the image forming apparatus 10 as described above.

On the other hand, in a case where the result of the first determination indicates that the current point value is equal to or greater than the predetermined threshold (or exceeds the predetermined threshold) and the result of the second determination in step S1111 indicates that the current point value is less than the predetermined threshold (or does not exceed the predetermined threshold), the upper limit determination unit 41A sends a report of an alert to the alert report unit 44 (step S1703) and returns the information indicative of the successful login to the image forming apparatus 10. The alert report unit 44 displays an alert screen 2000 illustrated in, for example, FIG. 18 on the operation panel 220 of the image forming apparatus 10 (step S1704). A case where the result of the second determination of step S1111 is equal to or greater than the predetermined threshold is as described above with reference to FIG. 11.

Figure 18:
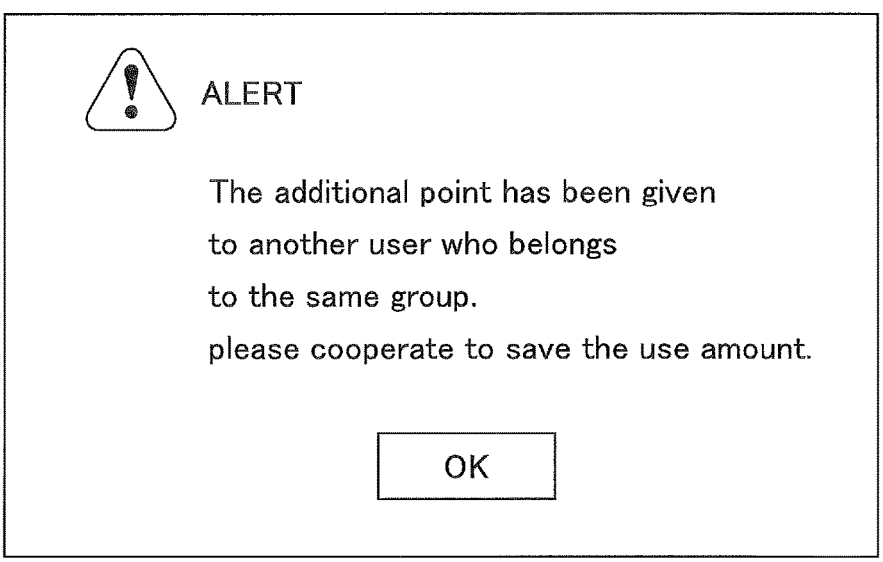
FIG. 18 is an image chart of an exemplary alert displayed on the image forming apparatus.

As described, even if the result of the first determination indicates that the current point value is equal to or greater than the predetermined threshold, when the result of the second determination is smaller than the threshold, the user U1 is enabled to log in the image forming apparatus 10. Meanwhile, in a case where the login is operated to be permitted when the result of the second determination indicates that the current point value is equal to or greater than the threshold, the user can log in regardless of the result of the second determination. However, in the case where the result of the first determination indicates that the current point value is equal to or greater than the predetermined threshold, an alert screen illustrated in FIG. 18 is displayed on the operation panel 220 of the image forming apparatus 10. With this, it is possible to report a recommendation of saving the usage amount of the image forming apparatus 10 to the user U1.

As described, in a case where the additional point value is set to a user, the correction point value of the second embodiment is set to the other users belonging to the group, to which the user belongs. Therefore, it is possible to prevent the points from being used to an extent over the sum of the upper limit point values of the users belonging to the group by displaying the alert screen illustrated in FIG. 18.

<<Setup Process of Additional Point Value>>

Figure 19:
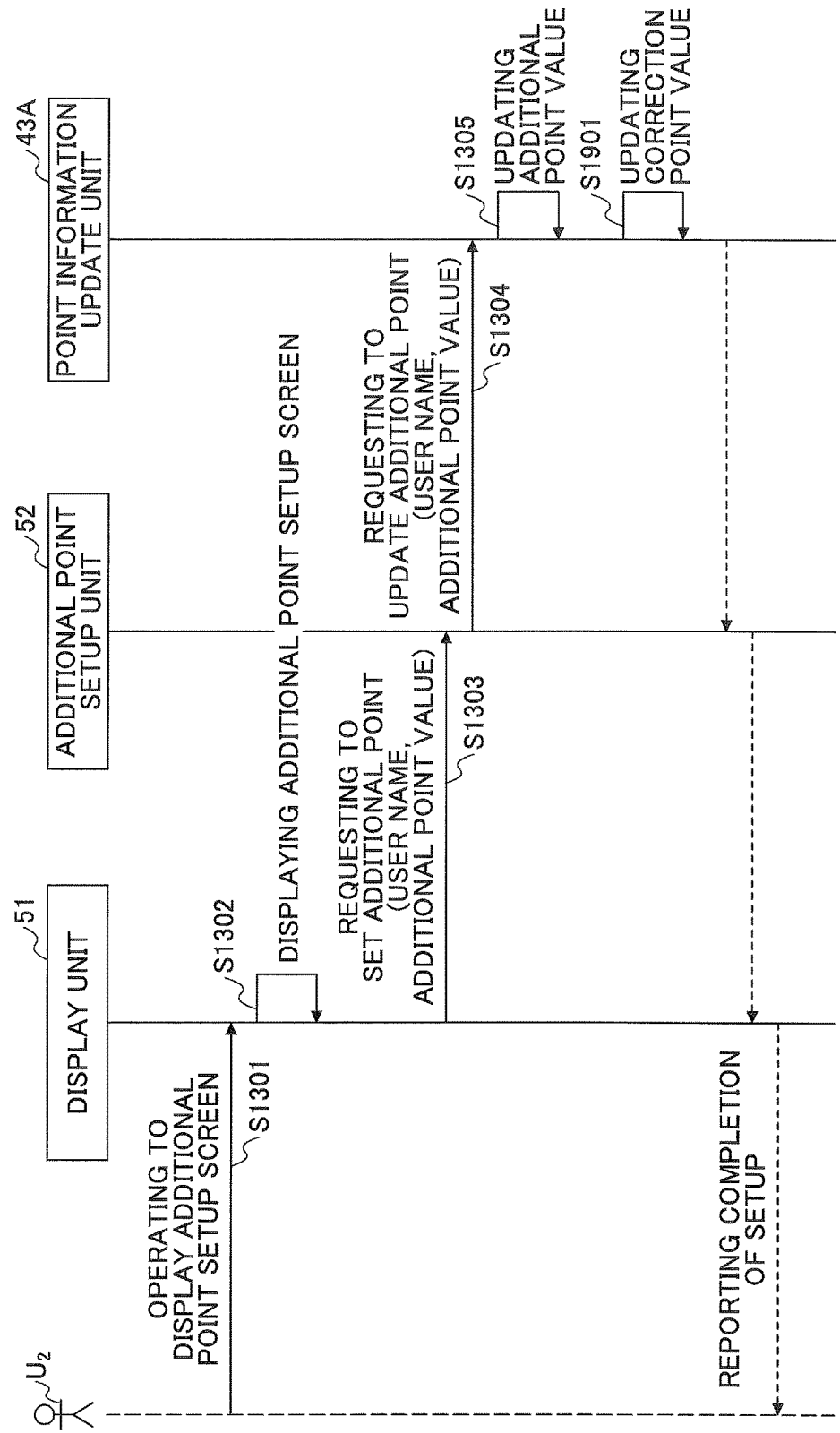
FIG. 19 is a sequence chart of an exemplary additional point value setup process of the second embodiment.

FIG. 19 is a sequence chart of an exemplary additional point value setup process of the second embodiment. The additional point value setup process of the second embodiment differs from the first embodiment at step S1901. Therefore, the process of step S1901 is described below.

The point information update unit 43A updates the correction point value of the corresponding user in the correction point information 48D (step S1901). For example, in a case where the additional point value of the user name of "tanaka" is updated to be "50" by the point information update unit 43A in step S1305, the correction point value of "50" is set to the user name of "yamada" who belongs to the same group as "tanaka" and does not have the set additional point value (the additional point value is "0"). Whether the additional point value is set to a certain user or not can be determined by referring the point information 46D. As such the correction point value is set to the other users who are other than the user, to whom the additional point value is set, and who belong to the same group as the group to which the user, to whom the additional point value is set, belongs. Thus, it is possible to prevent the points from being used to the extent over the sum of the upper limit point values in the group.

In a case where the number of the other users who do not have the set additional point value in one group is two or more, the correction point value of "50" may be set to each of the other users or may be divided by the number of the other users and the divided correction point values may be set to the other users, respectively. For example, the number of the other users is two in one group, the divided correction point values of "25" may be set to the other users, respectively.

The point information update unit 43A may clear (initialize) the correction point value set to the correction point information 48D for each predetermined time period (for example, beginning of each month) in a manner similar to the additional point value set to the point information 46D.

<General Overview>

As described, in the information processing system 1 of the first embodiment, the upper limit administration is performed by using the additional point value set for each user in addition to the upper limit point value set for each group. With this, not only the time and effort of the administrator in individually setting the upper limit point value for each user can be alleviated but also the flexible upper limit administration can be performed inconformity with the usage condition of each user.

In the information processing system 1 of the second embodiment, the upper limit administration is performed by using the correction point value set for each user. With this, it is possible to prevent the use from exceeding to the extent over the sum of the upper limit point values as a result of setting the additional point value to the certain user.

The group information memory unit 45 storing the upper limit point value for each user is an example of a first memory unit. The user information memory unit 46 storing the current point value and the additional point value for each user is an example of a second memory unit and an example of a third memory unit. The correction point information 48 storing the correction point value for each user is an example of a fourth memory unit. The upper limit determination unit 41 determining whether the current point value of the user reaches the upper limit or not is an example of a determination unit. The alert report unit 44 reporting an alert is an example of a report unit. The additional point setup unit 52 setting an additional point value for each user is an example of a setup unit.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.)

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the image processing unit has been described in detail, it should be understood that various changes, substitutions, and alterations could be made thereto without departing from the spirit and scope of the invention.

This application is based upon and claims the benefit of priority of the prior Japanese Patent Application No. 2014-210158, filed on Oct. 14, 2014, the entire contents of which are incorporated herein by reference.

What is claimed is:

1. An image processing unit comprising:
   a processor; and
   a memory that is configured to store
      a first setup value that is set for a group from among a plurality of groups, each group of the plurality of groups including at least one user, and indicates an upper limit of a usage amount, within which a user from among the at least one user can use a function,
      a second setup value that is set for the user and indicates the usage amount for the user to use the function, in addition to the first setup value,
      a current value that indicates a current usage amount of the function by the user, and
      program instructions to be executed by the processor, and that cause the processor to
         set the second setup value for the user,
         store the second setup value set for the user in the memory,
         determine whether the current value exceeds a predetermined first threshold determined using the first setup value set for a group, in which the user is included, and the second setup value set for the user, and
         determine whether a predetermined number of days has lapsed from a predetermined reference date in a case where the current value of the user is determined by the processor to exceed the predetermined first threshold, wherein
            in a case where a result of the determination indicates that the predetermined number of days has not lapsed from the predetermined reference date, the processor reports the information indicating that the current value of the user exceeds the predetermined first threshold to the user via a display included in an operation of the image processing unit, the memory is further configured to store a third setup value which is set for the user and is provided to restrict usage of the function by the user by subtracting the third setup value from the first setup value, and the execution of the program instructions further cause the processor to set the third setup value to another user, to whom the second setup value is not set, in a case where the second setup value is set for a user among the at least one user.

2. The image processing unit according to claim 1, wherein the predetermined first threshold is a sum of the first setup value and the second setup value, or a value obtained by multiplying the sum by a predetermined ratio.

3. The image processing unit according to claim 2, wherein the execution of the program instructions further causes the processor to:

change a value of the predetermined first threshold based on a number of days that has lapsed from the predetermined reference date in the case where the result of the determination indicates that the predetermined number of days has not lapsed from the predetermined reference date, wherein the value of the predetermined first threshold is changed by multiplying the sum of the first setup value and the second setup value by the predetermined ratio, and the predetermined ratio is increased as the number of days that has lapsed from the predetermined reference date increases.

4. The image processing unit according to claim 2, wherein the execution of the program instructions further cause the processor to report, in a case where the current value of the user is determined by the processor to exceed the predetermined first threshold, information indicating that the current value of the user exceed the predetermined first threshold.

5. The image processing unit according to claim 4, wherein the execution of the program instructions further cause the processor to determine whether a predetermined days lapses from a predetermined reference date in a case where the current value of the user is determined by the processor to exceed the predetermined first threshold, and report the information indicating that the current value of the user exceeds the predetermined first threshold in a case where a result of the determination indicates that the predetermined days does not lapse from the predetermined reference date.

6. The image processing unit according to claim 5, wherein the execution of the program instructions further causes the processor to set the second setup value for the user, and the memory is further configured to store the second setup value set for the user.

7. The image processing unit according to claim 6, wherein the memory is further configured to store a third setup value that is set for the user and that is provided to restrict usage of the function by the user by subtracting the third setup value from the first setup value, and the execution of the program instructions further cause the processor to set the third setup value to another user, to whom the second setup value is not set, in a case where the second setup value is set for a user among the at least one user.

8. The image processing unit according to claim 7, wherein the execution of the program instructions further cause the processor to determine whether the current value of the user exceeds the predetermined first threshold and whether the current value of the user exceeds a second threshold obtained by subtracting the third setup value from the first threshold, and report the information indicating that the current value of the user exceeds the second threshold in a case where the processor determines that the current value of the user exceeds the second threshold and does not exceed the predetermined first threshold.

9. The image processing unit according to claim 8, wherein the execution of the program instructions further cause the processor to determine whether a predetermined days lapses from a predetermined reference date in a case where the processor determines that the current value of the user exceeds the second threshold and does not exceed the predetermined first threshold, and report the information indicating that the current value of the user exceeds the second threshold in a case where a result of the determination indicates that the predetermined days does not lapse from the predetermined reference date.

10. The image processing unit according to claim 4, wherein the execution of the program instructions further cause the processor to set the second setup value for the user, wherein the second memory unit stores the second setup value set for the user.

11. The image processing unit according to claim 10, wherein the memory is further configured to store a third setup value that is set for the user and that is provided to restrict usage of the function by the user by subtracting the third setup value from the first setup value, and the execution of the program instructions further cause the processor to set the third setup value to another user, to whom the second setup value is not set in a case where the second setup value is set for a user among the at least one user.

12. The image processing unit according to claim 11, wherein the execution of the program instructions further cause the processor to determine whether the current value of the user exceeds the predetermined first threshold and whether the current value of the user exceeds a second threshold obtained by subtracting the third setup value from the first threshold, and report the information indicating that the current value of the user exceeds the second threshold in a case where the processor determines that the current value of the user exceeds the second threshold and does not exceed the predetermined first threshold.

13. The image processing unit according to claim 12, wherein the execution of the program instructions further cause the processor to
determine whether a predetermined days lapses from a predetermined reference date in a case where the processor determines that the current value of the user exceeds the second threshold and does not exceed the predetermined first threshold, and
report the information indicating that the current value of the user exceeds the second threshold in a case where a result of the determination indicates that the predetermined days does not lapse from the predetermined reference date.

14. The image processing unit according to claim 1, wherein the execution of the program instructions further cause the processor to
determine whether the current value of the user exceeds the predetermined first threshold and whether the current value of the user exceeds a second threshold obtained by subtracting the third setup value from the first threshold, and
report the information indicating that the current value of the user exceeds the second threshold in a case where the processor determines that the current value of the user exceeds the second threshold and does not exceed the predetermined first threshold.

15. The image processing unit according to claim 14, wherein the execution of the program instructions further cause the processor to
determine whether a predetermined days lapses from a predetermined reference date in a case where the processor determines that the current value of the user exceeds the second threshold and does not exceed the predetermined first threshold, and
report the information indicating that the current value of the user exceeds the second threshold in a case where a result of the determination indicates that the predetermined days does not lapse from the predetermined reference date.

16. An image processing system comprising:
a plurality of information processing apparatuses, each information processing apparatus of the plurality of information processing apparatuses includes
a processor; and
a memory that is configured to store
a first setup value that is set for a group from among a plurality of groups, each group of the plurality of groups including at least one user, and indicates an upper limit of a usage amount, within which a user from among the at least one user can use a function,
a second setup value that is set for the user and indicates the usage amount for the user to use the function, in addition to the first setup value,
a current value that indicates a current usage amount of the function by the user, and
program instructions to be executed by at least one processor from among the processors, and that cause the at least one processor to
set the second setup value for the user,
store the second setup value set for the user in the memory,
determine whether the current value exceeds a predetermined first threshold determined using the first setup value set for each of the groups and the second setup value set for the user, and
determine whether a predetermined number of days has lapsed from a predetermined reference date in a case where the current value of the user is determined by the processor to exceed the predetermined first threshold, wherein
in a case where a result of the determination indicates that the predetermined number of days has not lapsed from the predetermined reference date, the processor reports the information indicating that the current value of the user exceeds the predetermined first threshold to the user via a display included in an operation of the image processing unit,
the memory is further configured to store a third setup value which is set for the user and is provided to restrict usage of the function by the user by subtracting the third setup value from the first setup value, and
the execution of the program instructions further cause the processor to set the third setup value to another user, to whom the second setup value is not set, in a case where the second setup value is set for a user among the at least one user.

17. The image processing system according to claim 16, wherein
the predetermined first threshold is a sum of the first setup value and the second setup value; and
the execution of the program instructions further causes the processor to:
change a value of the predetermined first threshold based on a number of days that has lapsed from the predetermined reference date in the case where the result of the determination indicates that the predetermined number of days has not lapsed from the predetermined reference date, wherein
the value of the predetermined first threshold is changed by multiplying the sum of the first setup value and the second setup value by a predetermined ratio, and
the predetermined ratio is increased as the number of days that has lapsed from the predetermined reference date increases.

18. A determination method performed by at least one information processing apparatus, the determination method comprising:
acquiring a first setup value that is set for a group from among a plurality of groups, each group of the plurality of groups including at least one user, and indicates an upper limit of a usage amount, within which a user from among the at least one user can use a function;
acquiring a second setup value that is set for the user and indicates the usage amount for the user to use the function, in addition to the first setup value;
acquiring a current value that indicates a current usage amount of the function by the user;
setting the second setup value for the user;
storing the second setup value set for the user in the memory;
determining whether the current value of each user exceeds a predetermined first threshold determined using the first setup value set for a group, in which the user is included, and the second setup value set for the user, and
determining whether a predetermined number of days has lapsed from a predetermined reference date in a case where the current value of the user is determined by the processor to exceed the predetermined first threshold, wherein in a case where a result of the determination indicates that the predetermined number of days has not lapsed from the predetermined reference date, the processor reports the information indicating that the current value of the user exceeds the predetermined first threshold to the user via a display included in an operation of the image processing unit, the memory is further configured to store a third setup value which is set for the user and is provided to restrict usage of the function by the user by subtracting the third setup value from the first setup value, and the execution of the program instructions further cause the processor to set the third setup value to another user, to whom the second setup value is not set, in a case where the second setup value is set for a user among the at least one user.

19. The determination method according to claim 18, wherein the predetermined first threshold is a sum of the first setup value and the second setup value; and the execution of the program instructions further causes the processor to:

change a value of the predetermined first threshold based on a number of days that has lapsed from the predetermined reference date in the case where the result of the determination indicates that the predetermined number of days has not lapsed from the predetermined reference date, wherein the value of the predetermined first threshold is changed by multiplying the sum of the first setup value and the second setup value by a predetermined ratio, and the predetermined ratio is increased as the number of days that has lapsed from the predetermined reference date increases.

\* \* \* \* \*